United States Patent [19]
Kesting

[11] 4,096,803
[45] Jun. 27, 1978

[54] SOLID PROPELLANT AIR TURBO ROCKET

[75] Inventor: Lawrence W. Kesting, Huntsville, Ala.

[73] Assignee: The United States of America as represented by the Secretary of the Army, Washington, D.C.

[21] Appl. No.: 755,390

[22] Filed: Dec. 27, 1976

[51] Int. Cl.² .............................................. F42B 9/06
[52] U.S. Cl. ................................... 102/49.5; 60/246; 60/261; 60/270 S
[58] Field of Search ............................. 102/49.4, 49.5; 244/3.23; 60/246, 261, 270 S

[56] References Cited

U.S. PATENT DOCUMENTS

| | | | |
|---|---|---|---|
| 3,011,309 | 12/1961 | Carter | 102/49.4 |
| 3,034,293 | 5/1962 | Ferris et al. | 102/49.5 |
| 3,414,217 | 12/1968 | Kesting | 60/246 X |
| 3,535,881 | 10/1970 | Schubert | 60/270 S |
| 3,906,719 | 9/1975 | Beighley et al. | 60/261 |

Primary Examiner—Verlin R. Pendegrass
Attorney, Agent, or Firm—Nathan Edelberg; Robert P. Gibson; Hugh P. Nicholson

[57] ABSTRACT

This invention is a solid fuel air turbo rocket. A solid propellant charge, which is richer in fuel than conventional propellant compositions, burns in an initial chamber. The gases so produced pass through turbine blades into a second chamber. The turbine, which is rotated by the gases impinging on and passing through the blades, drives a compressor which compresses air from the atmosphere. This compressed air is fed into the second chamber where the oxygen in the air reacts with the fuel rich gas to produce further combustion and gas expansion. The gasious products so generated pass through a nozzle into the atmosphere, resulting in thrust to the missile. As the missile accelerates a variable area air inlet is reduced to maintain a normal shock at the throat. When ramjet take-over velocities are reached, the turbo-compressor is jettisoned to allow the second chamber to function as a ramjet burner.

1 Claim, 2 Drawing Figures

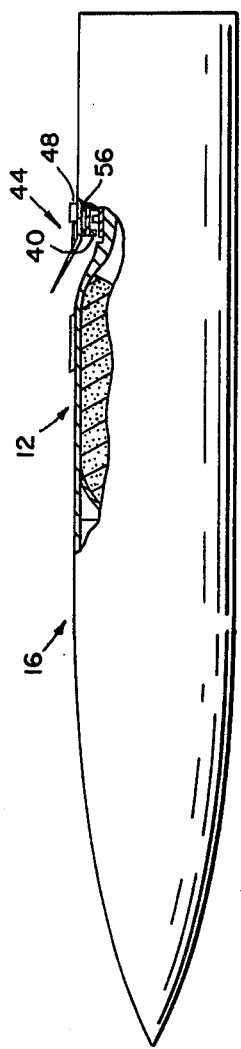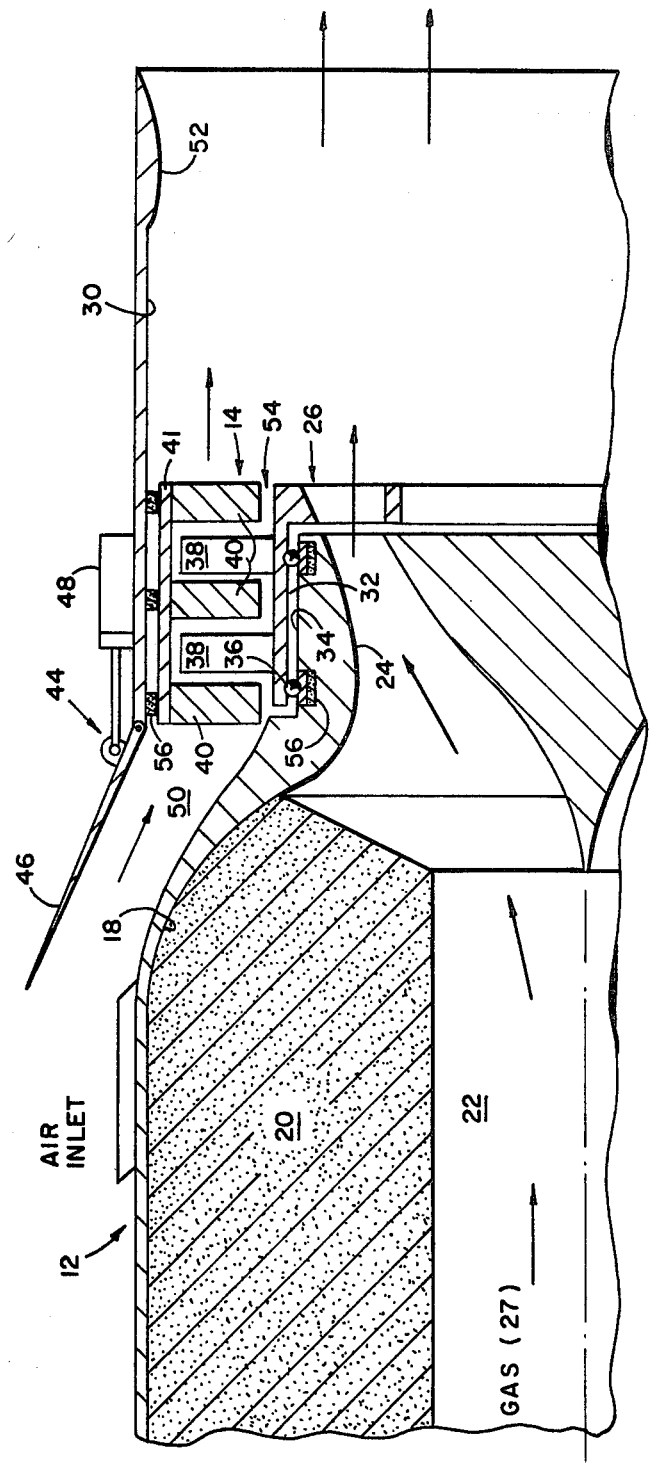

SOLID PROPELLANT AIR TURBO ROCKET

DEDICATORY CLAUSE

The invention described herein may be manufactured, used, and licensed by or for the Government for governmental purposed without the payment to me of any royalties thereon.

BACKGROUND OF THE INVENTION

This invention relates generally to a propulsion system for missiles and more specifically to the addition of a turbine driven air compressor and a second combustion chamber to a solid propellant motor. The invention has advantages for certain applications when compared to solid fuel ramjets.

One of the problems associated with solid propellant rocket motors used as boosters for ramjet sustainers is the relatively low specific impulse of the propellants. The weight of solid propellant required to obtain a given thrust for propelling a missile is appreciably greater than the weight of liquid propellant that would produce the same thrust. If the specific impulse of the solid propellants were greater, missiles using them could have a lower initial weight and perform the same function. This would be an advantage in the production and handling of the missiles.

Solid propellants consist primarily of granular oxidizer dispersed in a binder fuel. The weight ratio of oxidizer to binder varies from one composition to another, but it generally is in the ratio of 75 – 85% oxidizer to 15 – 25% fuel. This high ratio of oxidizer is required to insure complete combustion of the fuel. If some of the fuel can be combusted with oxygen from an outside source rather than from oxidizer contained in the propellant, less granular oxidizer would be needed in the propellant. As an example, if the ratio is changed from 80% oxidizer −20% fuel to 50% oxidizer −50% fuel, the weight of a propellant charge with a fixed amount of fuel would be reduced to 40% of the original weight. The thrust obtained from the complete combustion of the fuel remains approximately the same regardless of the source of the oxidizer.

An alternative to combusting solid propellant fuel entirely from granular oxidizer dispersed in the propellant is to use oxygen from surrounding air as a partial source of oxidizer. This is achieved in a solid fuel ramjet by placing a shroud around the nozzle of a fuel rich solid propellant motor. Air is admitted at the forward end of the shroud and mixes with fuel rich combustion products from the motor to produce additional burning, gas expansion, and thrust when discharged from the aft end of the shroud. The heretofore proposed solid fuel ramjets employ booster charges or motors. The booster, which is a conventional solid propellant rocket, overcomes the added drag and weight of the shroud, accelerates the missile to ramjet velocities, and is then separated. Counter rotating elements in spin stabilized solid ramjets have been proposed which could eliminate the booster but would limit application to subramjet velocities (less than Mach 2). Reference U.S. Pat. No. 3,414,217.

The liquid fueled Air Turbo Rocket (ATR) similar in concept to this invention utilizes a turbine driven air compressor in conjunction with afterburners to improve specific impulse. The well known tradeoffs between liquid and solid propulsion systems are applicable here. The general advantages of solids for embodiment of this invention lie in lower manufacturing costs, simplicity, storability, logistics, and reliability.

The use of atmospheric air to augment the thrust of solid rockets is attractive for relatively large diameter, long range missiles delivering heavy payloads.

SUMMARY OF THE INVENTION

This invention is a combination of a turbine driven air compressor and a rocket motor containing a fuel rich solid propellant. The propellant contains less granular oxidizer than does a normal solid propellant. The propellant fuel combusts in two stages, the first stage in a first chamber and the second in a second chamber. Combustion in the first chamber results from the fuel being partially oxidized by the granular oxidizer dispersed in the propellant fuel. This produces hot, fuel rich gases which pass into the second chamber through blades of a turbine which are located near an exhaust port of the first chamber. The passage of the gases through the blades turns the turbine. The turning turbine drives a compressor which compresses atmospheric air and feeds this air into the second chamber. The oxygen in the induced air reacts in the second chamber with the fuel in the gases from the initial combustion, thereby generating more heat and gas expansion. The hot gases produced by this second combustion passes through a nozzle of the second chamber and into the atmosphere, thus imparting thrust to a missile.

The turbine driven compressor is used in accelerating a missile from zero velocity to approximately Mach 2. At velocities of around Mach 2 and greater, the rocket motor can be operated as a pure ramjet since the passage of the missile through the atmosphere imparts enough compression to the scooped-in air so that it will feed into the secondary chamber without additional pressure boosting by the compressor. The turbine and compressor mechanism can therefore be jettisoned after the missile reaches Mach 2 velocity.

This invention achieves the following advantages:

1. When compared to a solid fuel ramjet with an internally oxidized solid propellant booster, overall specific impulse of the propellants is increased since atmospheric air is utilized during the boost phase.

2. When compared to solid fuel air-breather motors that incorporate a spinning shroud and/or center body such as those disclosed under U.S. Pat. No. 3,414,217, advantages are higher prelaunch spin rates of the compressor and operation at higher flight velocities.

BRIEF DESCRIPTION OF THE DRAWING

FIG. 1 illustrates a typical missile with a sectional view of an embodiment of a rocket motor in accordance with this invention.

FIG. 2 illustrates an enlarged view of the rocket motor shown in FIG. 1.

DETAILED DESCRIPTION OF THE PREFERRED EMBODIMENT

Referring to FIG. 1, a solid propellant rocket motor 12 with a turbine driven air compressor 14 is attached to missile 16. At FIG. 2 a first chamber 18 of the motor 12 contains a charge of fuel rich solid propellant 20 and a first combustion space 22. Located at an exhaust port 24 of the first chamber 18 is a turbine 26 which is positioned so that exhaust gases 27 from the chamber pass through the exhaust port 24, through the turbine blades 38, 40, and into a second chamber 30. The turbine is retained in its position with respect to the exhaust port by having a support ring 32 which rotates around the outer surface 34 of the first chamber exhaust port 24. Friction from the rotation is reduced by bearings 36 between the two surfaces. Attached to the turbine are rotor blades 38 which move between stator blades 40 which are fixed to a second support ring 41. The support ring 41 is attached to the walls of the second chamber 30 by means of a release mechanism 56. The combination of the rotor blades and stator blades forms a compressor 14 for compressing air from the atmosphere. The air is drawn into the compressor through a scoop mechanism 44. The flap 46 of the scoop 44 is moved by an actuator 48 to vary the air passage cross sectional area 50 in the throat through which the air passes into the compressor 14, thereby maintaining a normal shock at the throat and avoiding excessive drag. The air, upon being compressed to a pressure higher than that in the second chamber 30 flows from the compressor 14 into the chamber. The oxygen in the induced air combusts with the fuel rich gas 27 from the first chamber, producing further heat and gas expansion. This gas passes through the motor nozzle 52 into the atmosphere, resulting in thrust to the missile.

At a speed around Mach 2 the passage of the missile through the atmosphere compresses the air in the scoop to a pressure greater than that in the second chamber 30. At this point the compressor — turbine mechanism 54 is no longer needed and can be jettisoned by the release mechanism 56 that releases the entire rotating assembly as well as the stator blades. This release may be accomplished by use of shaped charges, release of retaining pins, or melting of key structural members. This mechanism 54 is ejected through the motor nozzle 52. Air then enters the second chamber and mixes with fuel rich gases in the same manner as done by a conventional ramjet engine. The missile can perform as a conventional ramjet at a velocity of approximately Mach 2 or greater until it reaches the target.

An embodiment of this invention can be produced by applying existing states of various arts without conducting excessive development or experimentation. It is noteworthy that the turbine blades can be made of ordinary metallic materials such as those used in jet aircraft engines. If the blades were to be in the path of gases produced by the normal solid propellant composition loaded with sufficient granular oxidizer to oxidize all of the propellant fuel, the gases so produced would be so hot (approximately 5000° F) that ordinary metals in their path would melt or suffer extensive errosion. However, the chemical composition of fuel rich propellants can be tailored to enable the turbine blades to endure during boost to ramjet velocities. Air bleeds and quenches can also be employed to reduce temperature. The use of duel propellants, one of which drives the turbine and the other bypasses the turbine and supplies fuel to the second combustion chamber 30, is another possibility for providing adequate turbine life.

I claim:

1. An air turbo solid propellant rocket motor comprising:
   a. a first chamber loaded with a fuel rich solid propellant and having a combustion space and an exhaust port;
   b. a turbine located outside of said first chamber at said exhaust port with blades of said turbine in the exhaust path of gases produced by the combustion of said propellant whereby the passing of said gases cause said blades to rotate;
   c. a second chamber attached to said first chamber, said second chamber having a combustion space into which said gases from said first chamber pass;
   d. a compressor driven by said turbine which compresses atmospheric air from outside said rocket motor and feeds said compressed air into said combustion space of said second chamber, whereby oxygen in said compressed air reacts with fuel in said gases from said first chamber;
   e. a nozzle attached to said second chamber through which combustion products of said compressed air and said gases pass into the atmosphere, whereby a thrust is given to a missile;
   f. means for jettisoning the compressor and turbine and their respective supporting rings, said jettisoning means being actuated when the rocket motor reaches a velocity of about Mach 2.

* * * * *